US012261449B2

(12) United States Patent
Lin et al.

(10) Patent No.: US 12,261,449 B2
(45) Date of Patent: Mar. 25, 2025

(54) ACCESSORY DEVICES TO IMPROVE WIRELESS POWER TRANSFER EFFICIENCY (71) Applicant: Apple Inc., Cupertino, CA (US)

(72) Inventors: Ruiyang Lin, Milpitas, CA (US); Matthew J Chabalko, Salinas, CA (US); Zaki Moussaoui, San Carlos, CA (US); Adam L Schwartz, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 475 days.

(21) Appl. No.: 17/650,602

(22) Filed: Feb. 10, 2022

(65) Prior Publication Data

US 2022/0263345 A1   Aug. 18, 2022

Related U.S. Application Data (63) Continuation of application No. PCT/US2021/057366, filed on Oct. 29, 2021, which
(Continued)

(30) Foreign Application Priority Data

Feb. 17, 2021 (CN) .......................... 202110186318.3

(51) Int. Cl.
*H02J 50/00* (2016.01)
*H01F 7/02* (2006.01)
*H02J 50/10* (2016.01)

(52) U.S. Cl.
CPC .......... *H02J 50/005* (2020.01); *H01F 7/0221* (2013.01); *H02J 50/10* (2016.02); *H02J 2310/22* (2020.01)

(58) Field of Classification Search
CPC ...... H02J 50/005; H02J 50/10; H02J 2310/22; H02J 50/70; H02J 50/90; H01F 7/0221;
(Continued)

(56) References Cited

U.S. PATENT DOCUMENTS 8,624,545 B2 * 1/2014 Hui .......................... H02J 50/27
320/108
9,793,743 B2 * 10/2017 Chien ....................... H02J 7/04
(Continued)

FOREIGN PATENT DOCUMENTS

CA    1276242 C   * 11/1990 ......... A61N 1/37223
EP    3497778 B1  *  1/2021 ........... H01F 27/346
(Continued)

OTHER PUBLICATIONS

Korean WIPS Report for Korean Patent Application No. 10-2023-7027534 dated Aug. 14, 2023; 10 pgs.
(Continued)

*Primary Examiner* — M Baye Diao
(74) *Attorney, Agent, or Firm* — FLETCHER YODER PC (57) ABSTRACT An accessory for improving wireless power transfer efficiency in a wireless power transfer system can include a magnetic (e.g., ferrite) core dimensioned and positioned so as to reduce flux coupling from the PTx winding into friendly metal of the PRx and/or to enhance flux coupling from the PTx winding to the PRx winding. The core may define an aperture corresponding to an outer dimension (e.g., outer diameter) of the PRx winding. The core may further have an outer dimension selected to intercept sufficient flux to reduce flux coupling into the friendly metal of the PRx, such as an outer dimension corresponding to an outer dimension (e.g., outer diameter) of the PTx winding. The accessory may be a case for the PRx device or may be
(Continued)

configured to be affixed to the face of the PTx device and may also include one or more alignment fixtures.

26 Claims, 5 Drawing Sheets

Related U.S. Application Data is a continuation of application No. PCT/US2021/028099, filed on Apr. 20, 2021.

(58) Field of Classification Search
CPC .......... H01F 3/08; H01F 7/0247; H01F 38/14; H04B 5/26; H04B 5/79
USPC ......................................................... 320/108
See application file for complete search history.

(56) References Cited

U.S. PATENT DOCUMENTS

| | | | |
|---|---|---|---|
| 9,991,742 B2* | 6/2018 | Mao | H02J 50/12 |
| 10,333,293 B2* | 6/2019 | Budhia | B60L 53/305 |
| 10,819,156 B2* | 10/2020 | Zaheer | H02J 50/12 |
| 11,469,040 B2* | 10/2022 | Ren | H02J 50/005 |
| 11,581,128 B2* | 2/2023 | Lohmann | H01F 27/2871 |
| 2011/0115429 A1* | 5/2011 | Toivola | H02J 50/10 |
| | | | 320/108 |
| 2012/0146576 A1 | 6/2012 | Partovi | |
| 2013/0257173 A1* | 10/2013 | Saitoh | H02J 50/70 |
| | | | 307/104 |
| 2013/0264864 A1 | 10/2013 | Kanno | |
| 2013/0285604 A1* | 10/2013 | Partovi | H02J 7/0044 |
| | | | 320/108 |
| 2014/0167524 A1 | 6/2014 | Oodachi et al. | |
| 2015/0115723 A1* | 4/2015 | Levo | H01F 27/36 |
| | | | 307/104 |
| 2015/0294427 A1 | 10/2015 | Han et al. | |
| 2017/0149474 A1 | 5/2017 | Kim | |
| 2018/0137971 A1 | 5/2018 | Jang | |
| 2019/0221363 A1* | 7/2019 | Choe | H02J 50/70 |
| 2019/0337393 A1 | 11/2019 | Von Novak et al. | |
| 2021/0265661 A1 | 8/2021 | Lee et al. | |
| 2022/0085654 A1* | 3/2022 | Maniktala | H02J 50/70 |
| 2024/0087803 A1* | 3/2024 | Spinella | H01F 27/366 |

FOREIGN PATENT DOCUMENTS

| | | | |
|---|---|---|---|
| JP | 2013135523 A | 7/2013 | |
| JP | 5667019 B2 | 2/2015 | |
| JP | 2015194933 A | 11/2015 | |
| JP | 202096414 A | 12/2021 | |
| KR | 10-2017-0058704 A | 5/2017 | |
| KR | 101810001 B1 | 12/2017 | |
| KR | 102019012594 A | 11/2019 | |
| WO | 2011156768 A2 | 12/2011 | |
| WO | 2013153736 A | 12/2015 | |

OTHER PUBLICATIONS

Korean WIPS Report for Korean Patent Application No. 10-2023-7027699 dated Aug. 16, 2023; 12 pgs.
Office Action for Korean Patent Application No. 10-2023-7027534 dated Apr. 2, 2024; 4 pgs.
Office Action for Korean Patent Application No. 10-2023-7027699 dated Apr. 2, 2024; 4 pgs.
Office Action for Japanese Patent Application No. 2023-548310 dated Sep. 18, 2024; 6 pgs., No translation given.
Office Action for Japanese Patent Application No. 2023-549622 dated Oct. 31, 2024; 3 pgs., No translation given.

* cited by examiner

ACCESSORY DEVICES TO IMPROVE WIRELESS POWER TRANSFER EFFICIENCY

CROSS-REFERENCE TO RELATED APPLICATIONS

This application claims priority to PCT Application No. PCT/US2021/057366, filed Oct. 29, 2021, entitled "Accessory Devices to Improve Wireless Power Transfer Efficiency", which is a continuation of PCT Application No. PCT/US2021/028099, filed Apr. 20, 2021, entitled "Accessory Devices to Improve Wireless Power Transfer Efficiency", which claims priority to Chinese Patent Application No. 202110186318.3, filed on Feb. 17, 2021, the disclosures of which are incorporated by reference in their entirety for all purposes.

BACKGROUND

Figure 1:
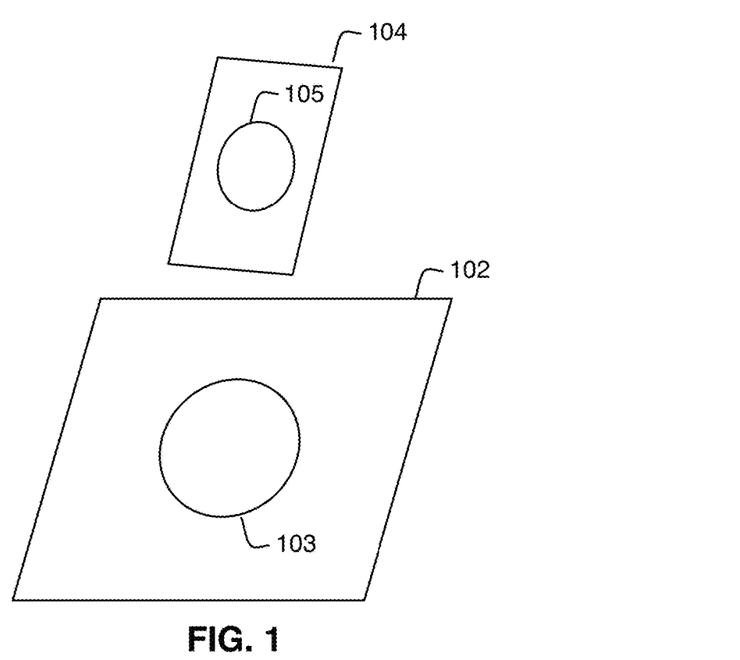
FIG. 1 depicts a wireless power transfer system.

An example wireless (inductive) power transfer system is depicted in FIG. 1. The efficiency of wireless (inductive) power transfer between a wireless power transmitter (PTx) 102 and a wireless power receiver (PRx) 104 depends on the degree of magnetic coupling between the respective windings of the PTx (winding 103) and the PRx (winding 105). Wireless (inductive) power transfer windings can take a variety of forms, including coils wound from suitable wire, such as magnet wire or Litz wire, or suitably formed traces on printed circuit boards (PCBs) or flexible printed circuit boards (flex circuits). These windings may be thought of as being generally circular and may but need not be substantially planar. By generally circular, it is meant that the winding forms a closed loop, although the shape may be any closed form, including squares, rectangles, circles, ovals, polygons, and other shapes, sometimes but not always having rounded corners. Additionally, the windings will often have a thickness corresponding to the distance between the outermost turns of the winding and the innermost turns of the winding. For example, a circular winding may have an outer diameter (corresponding to the diameter of the outermost windings) and an inner diameter (corresponding to the diameter of the innermost turns of the winding). Depending on the context, "diameter" as used herein may refer to either the outer diameter, inner diameter, or an average of the two. "Diameter" may also be understood as encompassing similar inner or outer dimensions for windings that are not strictly circular in shape, such as a length of a side for a square winding or the length of a major or minor axis for a rectangular or elliptical winding, etc.

SUMMARY

One factor that can affect the degree of magnetic coupling between the windings is the relative sizes of these windings. In cases where there is a size mismatch between the PTx and PRx coils, magnetic flux from the PTx winding can couple into metallic structures of the receiving device other than the receiver winding. Such structures may be known or referred to as "friendly metal". This coupling may be undesirable because it wastes energy from the transmitter, causing reduced efficiency. In some cases, such undesired magnetic coupling may also lead one or both of the PTx and PRx devices to misunderstand the amount of wireless power that is being transmitted, leading to feedback loop difficulties.

An accessory for improving wireless power transfer efficiency in a wireless power transfer system including a power transmitter (PTx) having a PTx winding and a power receiver (PRx) having a PRx winding, wherein the PTx winding and PRx winding are dimensionally mismatched, can include a core formed from a material having selected magnetic properties. The core may be dimensioned and positioned so as to perform at least one of reducing flux coupling from the PTx winding into friendly metal of the PRx and enhancing flux coupling from the PTx winding to the PRx winding. The core may be a ferrite core. The dimensional mismatch between the PTx winding and the PRx winding can include a PTx winding larger than the PRx winding. In such case, the core can define an aperture corresponding to an outer dimension of the PRx winding. The core can have an outer dimension selected to intercept sufficient flux to reduce flux coupling into the friendly metal of the PRx. The aperture can have an inner diameter corresponding to an outer diameter of the PRx winding. The accessory may be constructed in various forms, including a shim configured to be attached to either the PTx or the PRx by adhesives, magnets, mechanical features, etc. The accessory may also be constructed as a case for an electronic device, such as a smartphone, smartwatch, etc.

An accessory may be configured to improve wireless power transfer efficiency between an electronic device and a wireless charger when a wireless charging winding of the electronic device and a wireless charging winding of the wireless charger are dimensionally mismatched. The accessory can include a core formed from a material having selected magnetic properties, the core being dimensioned and positioned so as to perform at least one of reducing flux coupling from the wireless charging winding of the wireless charger into metal of the electronic device and enhancing flux coupling from the wireless charging winding of the wireless charger into the wireless charging winding of the device. The accessory can further include one or more alignment fixtures. The one or more alignment fixtures can be configured to align or secure the accessory with respect to the electronic device. Additionally or alternatively, the one or more alignment fixtures can be configured to align or secure the case with respect to the wireless charger. The alignment fixture can include one or more magnets. The one or more magnets can form a ring. The core can be a ferrite core. The dimensional mismatch can include the wireless charging winding of the wireless charger being larger than the wireless charging winding of the electronic device. In such case, the core can define an aperture corresponding to an outer dimension of the wireless charging winding of the electronic device. The core can have an outer dimension selected to intercept sufficient flux to reduce flux coupling into the friendly metal of the electronic device. The aperture can have an inner diameter corresponding to an outer diameter of the wireless charging winding of the wireless charger.

A wireless charging accessory device can include means for reducing flux coupling from a wireless power transmitting winding of a wireless power transmitter into friendly metal of a wireless power receiver or for enhancing flux coupling from the wireless power transmitting winding into a dimensionally mismatched wireless power receiving winding of the wireless power receiver and means for aligning the means for reducing flux coupling from the wireless power transmitting winding of the wireless power transmitter into friendly metal of the wireless power receiver or for enhancing flux coupling from the wireless power transmitting winding into the wireless power receiving winding of the wireless power receiver with respect to at least one of the wireless power receiver or the wireless power transmitter.

The means for reducing flux coupling from the wireless power transmitting winding of the wireless power transmitter into friendly metal of the wireless power receiver or for enhancing flux coupling from the wireless power transmitting winding into the wireless power receiving winding of the wireless power receiver can be a ferrite core. The dimensional mismatch between the wireless power transmitting winding and the wireless power receiving winding can include a wireless power transmitting winding larger than the wireless power receiving winding and wherein the core defines an aperture corresponding to an outer dimension of the wireless power receiving winding. The core can have an outer dimension selected to intercept sufficient flux to reduce flux coupling into the friendly metal of the wireless power receiver.

An accessory may be configured to be affixed to the face of a wireless power transmitter to improve wireless power transfer efficiency between an electronic device and the wireless power transmitter, wherein a wireless charging winding of the electronic device and a wireless charging winding of the wireless power transmitter are dimensionally mismatched. The accessory can include a core formed from a material having selected magnetic properties, the core being dimensioned and positioned so as to perform at least one of: reducing flux coupling from the wireless charging winding of the wireless power transmitter into metal of the electronic device; and enhancing flux coupling from the wireless charging winding of the wireless power transmitter into the wireless charging winding of the electronic device. The accessory can be configured to be affixed to the face of the wireless power transmitter by an adhesive or by other ways, such as mechanical fasteners, etc. The core can be a ferrite ring dimensioned to shield the metal of the electronic device from flux induced by at least one wireless charging winding of the wireless power transmitter. The ferrite ring can include one or more tabs sized and dimensioned to be positioned near one or more wireless charging windings of the wireless power transmitter to provide a desired level of shielding or flux redirection. The core can further include additional ferrite bars sized and dimensioned to be positioned near one or more wireless charging windings of the wireless power transmitter to provide a desired level of shielding or flux redirection.

DETAILED DESCRIPTION OF SPECIFIC EMBODIMENTS

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Figure 2A:
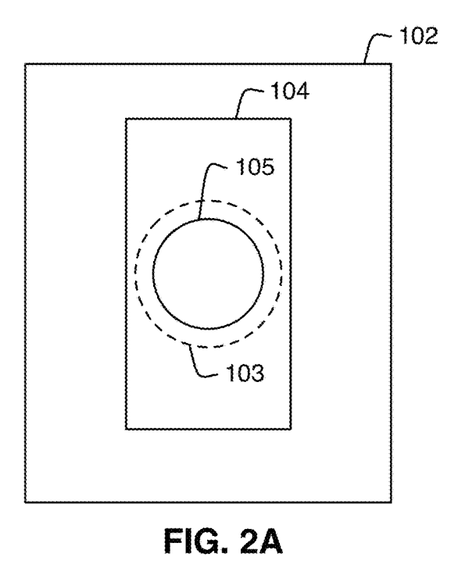
FIGS. 2A and 2B depict a wireless power transfer system illustrating flux coupling in a situation with coils having different sizes.
Figure 2B:
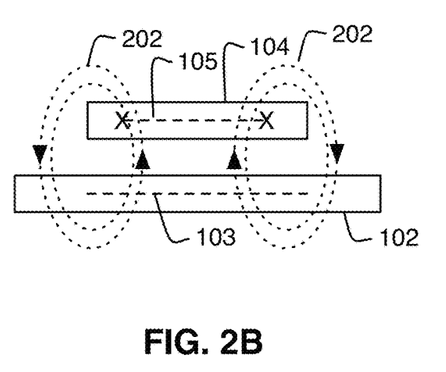

FIGS. 2A and 2B illustrate a wireless (inductive) power transfer arrangement including a size mismatch between the PTx winding 103 and the PRx winding 105. In the illustrated arrangement, PTx winding 103 has a larger diameter than PRx winding 105. In other circumstances, not illustrated, the reverse could be true. In the profile view of FIG. 2B, flux lines 202 illustrate an exemplary flux path associated with driving PTx winding 103 (shown in plan view in FIG. 2A) in a counterclockwise direction. As can be seen in FIG. 2B, some of flux lines 202 pass through PRx winding 105. This portion of the flux may be thought of effectively coupled to the PRx device. However, some of the flux lines 202 do not pass through PRx winding 105, but rather, reach metallic components of PRx device 104 (i.e., the aforementioned "friendly metal"), which is denoted by the "X" markings in FIG. 2B. To the extent that some of the magnetic flux from 103 interacts with the friendly metal rather than PRx winding 105, the magnetic coupling between PTx and PRx is reduced. This may be at least in part because of the differing sizes of the respective PTx and PRx windings 103 and 105.

Figures 3A, 3B:
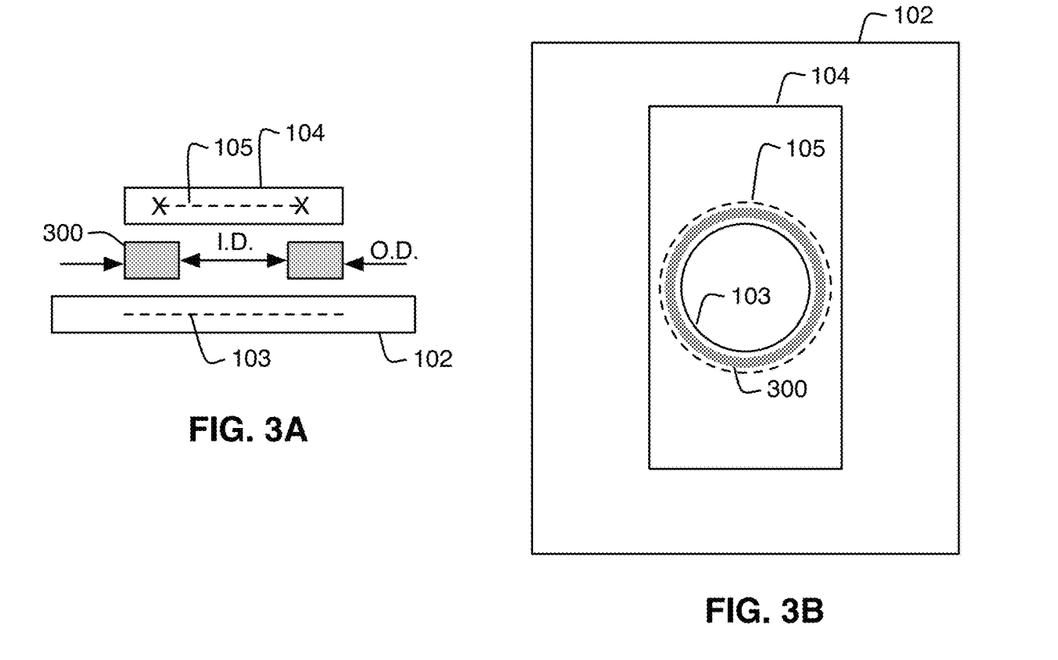
FIGS. 3A and 3B depict a wireless power transfer system having an accessory interposed between the PTx and PRx to improve wireless power transfer efficiency.

One way to address this size mismatch and improve the degree of magnetic coupling between PTx and PRx windings 103 and 105 is to provide a flux shielding and/or redirecting accessory between the PTx and the PRx. FIG. 3A illustrates a profile view of such an arrangement, while FIG. 3B illustrates a plan view of such an arrangement. The flux shielding and/or redirecting accessory may include a core 300 made from ferrite or other ferromagnetic material having suitable magnetic properties, such as sintered ferrite or nanocrystalline sheets. Core 300 may be dimensioned so as to shield the friendly metal of the PRx 104 from flux induced by the PTx winding 104 and/or to effectively redirect some or substantially all of that flux into the PRx winding 105.

In the illustrated example having a relatively larger PTx coil 103 and a relatively smaller PRx coil 105, the ferrite core 300 may be a ring shape having an inner diameter (ID) that generally corresponds to the inner diameter of the PRx coil and an outer diameter (OD) sufficiently large to intercept flux from the PTx coil that would otherwise couple into the friendly metal. By positioning such a core 300 between, generally parallel to, and substantially overlapping and coaxial with the respective windings, magnetic coupling between the windings 103, 105 may be improved and flux coupling into the friendly metal of the PRx device 104 may be reduced.

A substantially similar solution can also be implemented in the reverse situation, in which the PRx coil is larger and the PTx coil winding is smaller. Also, as noted above, the shapes of the respective windings and core need not be strictly circular, but could be any closed or substantially closed shape, such that the diameters referenced above could be inner side lengths, major and minor axis lengths, etc. By "substantially closed" shape, it is to be understood that the core could be constructed from two or more segments of magnetic material with relatively smaller (compared to the core size) gaps between the segments. What matters is that core 300 be positioned and dimensioned so as to reduce undesired flux coupling from the PTx winding 103 into the friendly metal of PRx device 104 and/or to enhance flux coupling into PRx winding 105. Additionally, although the described embodiment features substantially planar coils and core 300, the same principles apply to non-planar windings and non-planar intermediate cores 300. In such embodiments, intermediate core 300 should be shaped, positioned, and dimensioned so as to reduce undesirable flux coupling into so-called "friendly metal" and/or to increase the amount of flux that couples into the PRx winding.

In various other implementations core 300 dimensionally conforms to the shape of the PTx coil instead of the PRx coil. For example, putting the phone within a case may align ferrite core 300 with the power transmitting winding 103 of charging pad 102 so that the outer diameter of the ferrite core/ring 300 algins with the diameter of the transmitter winding 103, and the inner diameter of the ferrite core/ring 300 is sized so that the central aperture of structure 300 allows flux to flow to power receiving window 105 of the phone 104. That is, the inner diameter of the ferrite core/ring 300 is larger than the inner diameter of the power receiving winding 105 of the phone 104. In some cases, the inner diameter of the ferrite core/ring 300 is larger than the inner diameter and smaller than the outer diameter of the power receiving winding 105.

Figure 4A:
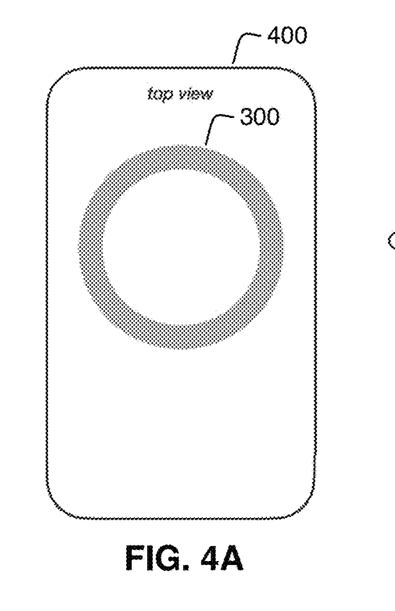
FIGS. 4A-4B, 5A-5B, 6A-6B, and 7A-7B illustrate respective embodiments of a wireless power transfer efficiency enhancing accessory.
Figure 4B:
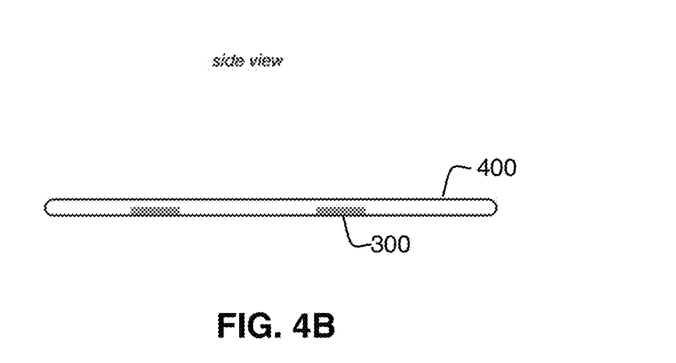

In various implementations of PTx devices 102 and PRx devices 104, the intermediate device incorporating core 300 may take a variety of forms. As one example, the PTx 102 may be a charging mat, PRx 104 may be an electronic device, such as mobile phone, smart watch, tablet computer, wireless earphone charging case or other device, and the intermediate device incorporating ferrite core 300 may be an accessory 400 for the electronic device as illustrated in FIGS. 4A (plan view) and 4B (profile view). Accessory 400 may be a case for the mobile phone, a "shim" that can be disposed between the PTx and PRx, or another intermediate device incorporating ferrite core 300. Ferrite core 300 may be disposed in accessory 400, with the accessory being designed and dimensioned to appropriately position core 300 relative to the PRx winding of the PRx device. For example, putting the phone within a case may suitably align ferrite core 300 with the power receiving winding 105 of the phone 104 so that that the inner diameter of the ferrite core/ring 300 aligns with the outer diameter of the receiver winding 105 and the annulus of the ferrite core/ring 300 shields friendly metal of the phone 104 from the flux induced by PTx winding 103 of charging pad 102.

Figure 5A:
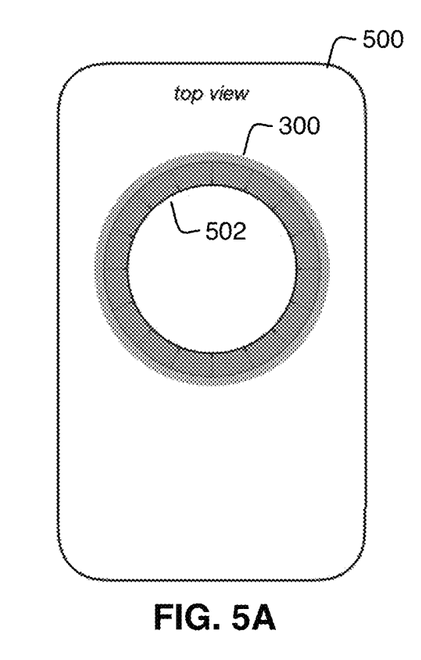
Figure 5B:
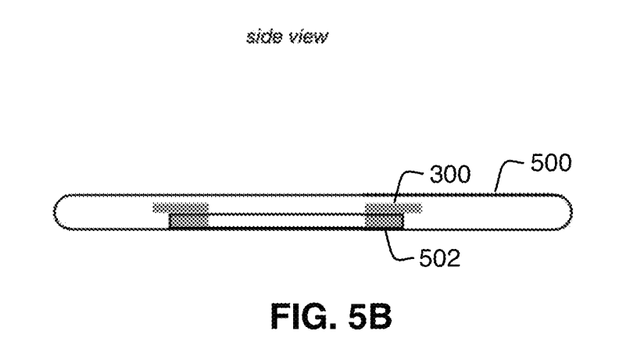

As illustrated in FIGS. 5A-5B, 6A-6B, and 7A-7B, a case 500, 600, or 700, respectively, may also optionally include one or more mechanisms for assisting a user to align the accessory/phone combination with an external charging device. As but one example, such an accessory, whether a case, shim, or otherwise, may also include one or more magnets that can serve to align the accessory/device combination with a wireless power transmitter and/or receiver device having complementarily arranged magnets. This alignment can assist with aligning the respective coils of the devices as well as aligning the ferrite core 300 with the PTx winding 103 and/or PRx winding 105. In FIGS. 5A and 5B, magnet ring 502 is depicted as being below ferrite ring 300, or, in other words, ferrite ring 300 is disposed between the magnets and the device (e.g., phone, not shown). As in the embodiment of FIGS. 4A and 4B, ferrite ring 300 prevents flux from the transmitter coupling into the "friendly metal" of the device, reducing undesirable power loss and associated heating. Additionally, the magnets of magnet ring 502 may be segmented to reduce losses. In this embodiment, the accessory may be mechanically positioned and secured to the device (according to various known techniques), and the magnets may be used to assist in attaching and aligning the device/accessory combination to the power transmitting device (e.g., a charging pad, not shown). Additionally, as noted above, and described in greater detail below, ferrite ring 300 may also be segmented, in which case magnet ring segments and ferrite ring segments may be interspersed as illustrated below with respect to FIG. 10.

Figure 6A:
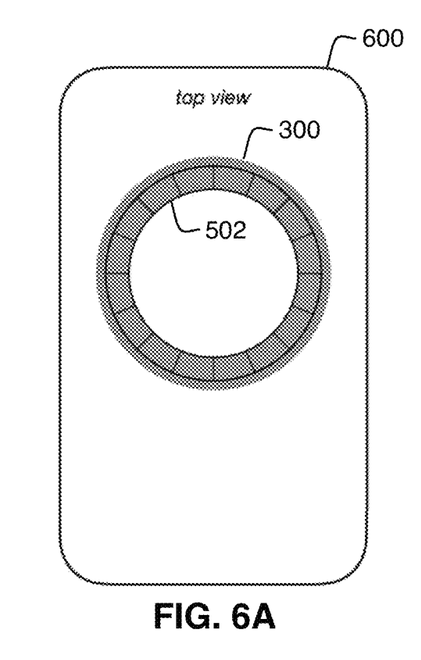
Figure 6B:
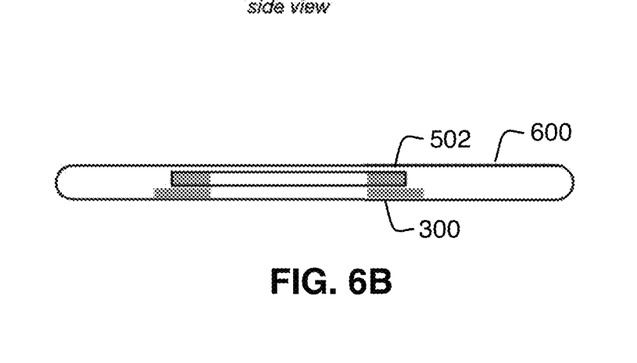

In FIGS. 6A and 6B, magnet ring 502 is depicted as being above ferrite ring 300, or, in other words, ferrite ring 300 is disposed between the magnets and the power transmitting device (not shown, e.g., a charging pad). As in the embodiment of FIGS. 4A-4B and 5A-5B, ferrite ring 300 prevents flux from the transmitter coupling into the "friendly metal" of the device, reducing undesirable power loss and associated heating. Additionally, the magnets of magnet ring 502 may be segmented to reduce losses. In this embodiment, the accessory (e.g., case or shim) may be magnetically secured (and aligned) to the device (e.g., phone), and the device/accessory combination may be freely positioned with respect to the power transmitting device (e.g., a charging pad, not shown). As above and described in greater detail below, ferrite ring 300 may also be segmented, in which case magnet ring segments and ferrite ring segments may be interspersed as illustrated below with respect to FIG. 10.

Figure 7A:
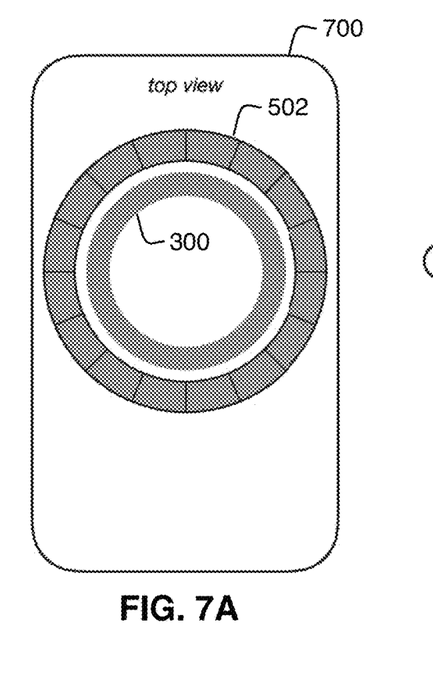
Figure 7B:
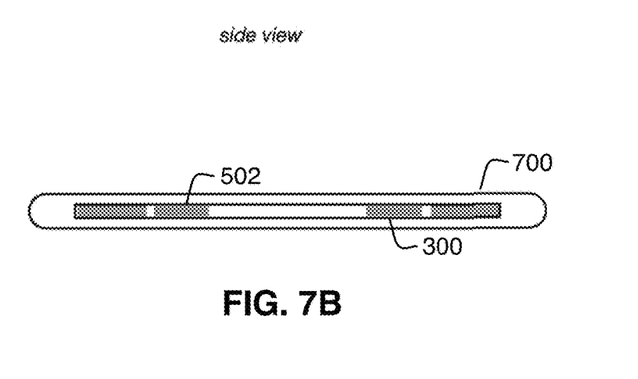

In FIGS. 7A and 7B, magnet ring 502 is depicted as being substantially in the same plane as ferrite ring 300. Exact coplanarity is not required, and may not even be possible depending on the respective heights of the magnets and ferrite core for a given embodiment. As in the embodiments of FIGS. 4A-4B, 5A-5B, and 6A-6B discussed above, ferrite ring 300 prevents flux from the transmitter coupling into the "friendly metal" of the device, reducing undesirable power loss and associated heating. Additionally, the magnets of magnet ring 502 may be segmented to reduce losses. In this embodiment, magnets may be used to secure and position the accessory with respect to the device and/or the power transmitting device (e.g., a charging pad).

Figure 10:
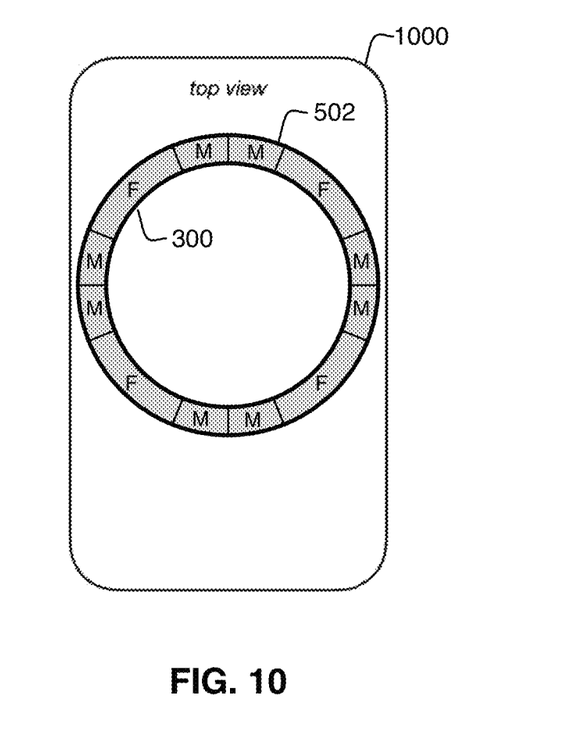
FIG. 10 illustrates a wireless power transfer efficiency enhancing accessory including a segmented ferrite core with a corresponding magnet ring.

In FIG. 10, like FIGS. 7A and 7B, magnet ring 502 is depicted as being substantially in the same plane as ferrite ring 300. As discussed above, exact coplanarity is not required, particularly in view of the possibility of different respective heights of the magnets and ferrite core for a given embodiment. However, for packaging, it may be helpful for magnet components in ring 502 and ferrite components in ring 300 to be arranged such that at least part of these components are co-planar so as to reduce z-height of the resulting accessory. As in the embodiments of FIGS. 4A-4B, 5A-5B, 6A-6B, and 7A-7B discussed above, ferrite ring 300 prevents flux from the transmitter coupling into the "friendly metal" of the device, reducing undesirable power loss and associated heating. Additionally, the magnets of magnet ring 502 are segmented into segments "M" to reduce losses and improve manufacturability. Ferrite ring 300 is likewise segmented into segments "F," which are interposed between magnet segments "M." As above, the magnets may be used to secure and position the accessory with respect to the device and/or the power transmitting device (e.g., a charging pad). The relative size of the magnet segments and ferrite segments, both radially and circumferentially, may be adjusted as required to provide a sufficient fastening force as between accessory 1000 and the device (e.g., phone) and/or power transmitter (by increasing the size of the magnets) and/or to increase the flux shielding/coupling effect (by increasing the size of the ferrite segments). In some embodiments, the relative positioning of the magnet ring segments and ferrite ring segments may be such that the various segments are substantially collinear along the circumference of the respective rings. Depending on the particular dimensions of the ferrite ring segments and magnet ring segments, exact collinearity may not be required or provided, as broad collinearity around the circumference may be appropriate for some applications.

Figure 8:
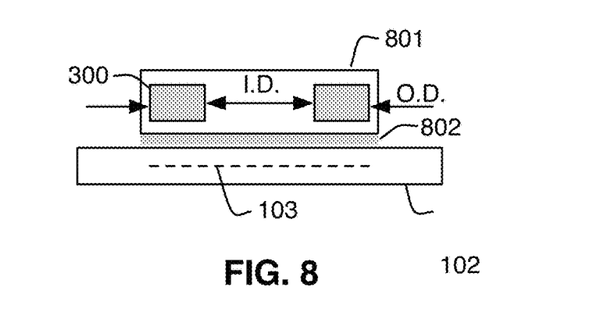
FIG. 8 illustrates an embodiment of a flux shielding/redirecting accessory incorporating a ferrite core.

FIG. 8 illustrates an alternative embodiment of a flux shielding/redirecting accessory 801 incorporating ferrite core 300. Accessory 801 may be a shim device adapted for positioning, and optionally securing, to the PTx device 102 itself. (As above, PTx device 102 may, for example, be a charging mat, charging pad, or other suitable wireless/inductive charging device.) Accessory 801 may also include mechanical, adhesive, and/or magnetic features 802 for aligning and/or securing the intermediate device 801 with respect to the PTx 102 and the associated PTx winding 103. As above, core 300 should be dimensioned as positioned so as to suitably reduce undesired flux coupling into friendly metal of the PRx device (such as a mobile phone or other electronic device or accessory) and/or to enhance flux coupling into the PRx winding 105 of the PRx device. As such, it will need to be positioned relative to the PTx winding 105 such that it intercepts and/or redirects flux that would ordinarily couple into the friendly metal of the PRx device.

Figure 9:
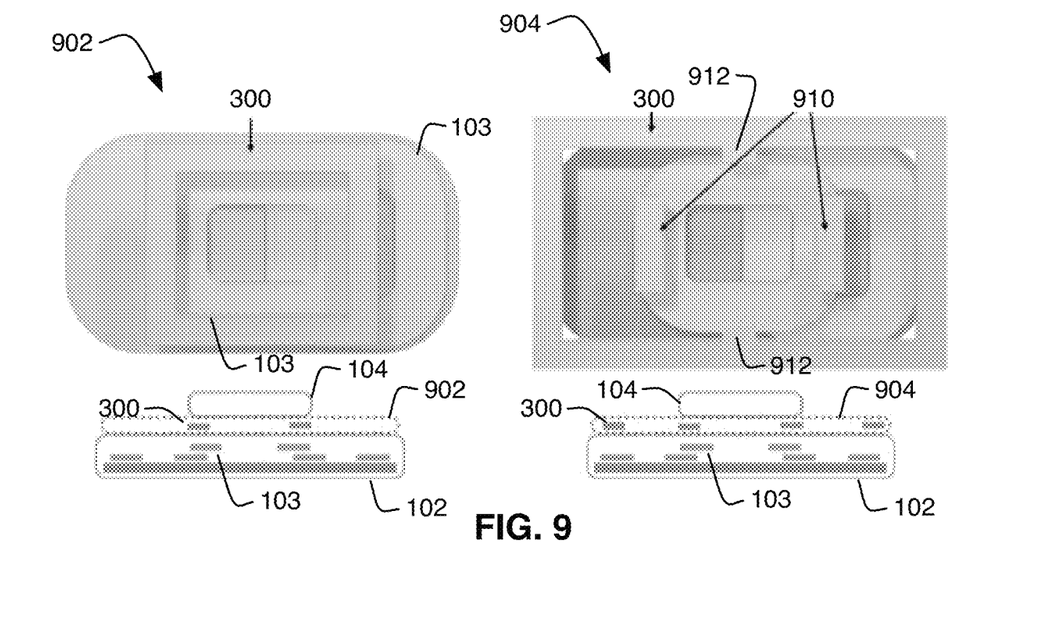
FIG. 9 illustrates further details of the flux shielding/redirecting accessory of FIG. 8.

FIG. 9 illustrates further details of embodiments 902, 904 of a flux shielding/redirecting accessory 801 (FIG. 8). In embodiments 902 and 904 the PTx device 102 can include a plurality of transmit coils 103, arranged as a DDQ coil. Accessory 902, 904 may be positioned between the PTx device 102 and the PRx device 104 (e.g., a mobile phone). Accessory 902, 904 may include a ferrite ring 300, which may be implemented as a ferrite frame 300 surrounding the top/Q coil 103 of PTx device 102. As a result, friendly metal of the PRx device 104 is effectively shielded from flux induced by coil 103. Similarly, accessory 904 may include a ferrite frame covering all or substantially all of the transmitting area of PTx device 904. In such embodiments, additional ferrite bars 910 may be provided near particular coils as required to provide the requisite level of shielding/flux redirection. Optional tabs 912 in ferrite ring/frame 300 may also be used to similar effect.

The foregoing describes exemplary embodiments of accessories for wireless power transfer systems that provide for improved coupling between wireless power transmitter (PTx) and wireless power receiver (PRx) devices. Such systems may be used in a variety of applications but may be particularly advantageous when used in conjunction with electronic devices such as mobile computing devices (e.g., laptop computers, tablet computers, smart phones, and the like) and their accessories (e.g., wireless earphones, styluses and other input devices, etc.) when used in conjunction with wireless charging devices (e.g., charging mats, pads, stands, etc.) constructed in anticipation of being used with different devices. Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An accessory configured to improve wireless power transfer efficiency between an electronic device and a wireless charger, wherein a wireless charging winding of the device and a wireless charging winding of the wireless charger are dimensionally mismatched, the accessory comprising:
   one or more alignment magnets that align and secure the accessory with respect to one or more alignment magnets in the electronic device; and
   a core formed from a ferromagnetic material, the core being dimensioned and positioned so as to:
      reduce flux coupling from the wireless charging winding of the charger into friendly metal of the electronic device, the friendly metal including the one or more alignment magnets of the electronic device; and
      enhance flux coupling from the wireless charging winding of the wireless charger into the wireless charging winding of the electronic device.

2. The accessory of claim 1 wherein the one or more alignment magnets further align or secure the accessory with respect to the wireless charger.

3. The accessory of claim 1 wherein the one or more alignment magnets form a ring.

4. The accessory of claim 1 wherein the core is a ferrite core.

5. The accessory of claim 1 wherein the dimensional mismatch comprises the wireless charging winding of the wireless charger being larger than the wireless charging winding of the electronic device and wherein the core defines an aperture corresponding to an outer dimension of the wireless charging winding of the electronic device.

6. The accessory of claim 5 wherein the core has an outer dimension selected to intercept sufficient flux to reduce flux coupling into the friendly metal of the electronic device.

7. The accessory of claim 6 wherein the aperture has an inner diameter corresponding to an outer diameter of the wireless charging winding of the wireless charger.

8. The accessory of claim 1 wherein the accessory is a case for the electronic device.

9. The accessory of claim 1 wherein the accessory is a shim configured to be disposed between the device and the wireless charger.

10. An accessory configured to be affixed to the face of a wireless power transmitter to improve wireless power transfer efficiency between an electronic device and the wireless power transmitter, wherein a wireless charging winding of the electronic device and a wireless charging winding of the wireless power transmitter are dimensionally mismatched, the accessory comprising:
a core formed from a ferromagnetic material, the core being dimensioned and positioned so as to:
reduce flux coupling from the wireless charging winding of the wireless power transmitter into friendly metal of the electronic device including one or more alignment magnets of the electronic device; and
enhance flux coupling from the wireless charging winding of the wireless power transmitter into the wireless charging winding of the electronic device; and
one or more alignment magnets that align and secure the accessory with respect to the electronic device.

11. The accessory of claim 10 wherein the core is ferrite ring dimensioned to shield the metal of the electronic device from flux induced by at least one wireless charging winding of the wireless power transmitter.

12. The accessory of claim 11 wherein the ferrite ring comprises one or more tabs sized and dimensioned to be positioned near one or more wireless charging windings of the wireless power transmitter to provide a desired level of shielding or flux redirection.

13. The accessory of claim 11 wherein the ferrite core further comprises additional ferrite bars sized and dimensioned to be positioned near one or more wireless charging windings of the wireless power transmitter to provide a desired level of shielding or flux redirection.

14. An accessory configured to improve wireless power transfer efficiency between an electronic device and a wireless charger, wherein a wireless charging winding of the electronic device and a wireless charging winding of the wireless charger are dimensionally mismatched, the accessory comprising:
one or more alignment magnets that align and secure the accessory with respect to one or more alignment magnets in the wireless charger; and
a core formed from a ferromagnetic material, the core being dimensioned and positioned so as to:
reduce flux coupling from the wireless charging winding of the wireless charger into friendly metal of the electronic device, the friendly metal including the one or more alignment magnets of the electronic device; and enhance flux coupling from the wireless charging winding of the wireless charger into the wireless charging winding of the electronic device.

15. The accessory of claim 14 wherein the one or more alignment magnets further align and secure the accessory with respect to the electronic device.

16. The accessory of claim 14 wherein the one or more magnets form a ring.

17. The accessory of claim 14 wherein the core is a ferrite core.

18. The accessory of claim 14 wherein the dimensional mismatch comprises the wireless charging winding of the wireless charger being larger than the wireless charging winding of the electronic device and wherein the core defines an aperture corresponding to an outer dimension of the wireless charging winding of the electronic device.

19. The accessory of claim 18 wherein the core has an outer dimension selected to intercept sufficient flux to reduce flux coupling into friendly metal of the electronic device.

20. The accessory of claim 19 wherein the aperture has an inner diameter corresponding to an outer diameter of the wireless charging winding of the wireless charger.

21. The accessory of claim 14 wherein the accessory is a case for the wireless charger.

22. The accessory of claim 14 wherein the accessory is a shim configured to be disposed between the electronic device and the wireless charger.

23. An accessory configured to be affixed to the face of a wireless power transmitter to improve wireless power transfer efficiency between an electronic device and the wireless power transmitter, wherein a wireless charging winding of the electronic device and a wireless charging winding of the wireless power transmitter are dimensionally mismatched, the accessory comprising:
a core formed from a ferromagnetic material, the core being dimensioned and positioned so as to:
reduce flux coupling from the wireless charging winding of the wireless power transmitter into friendly metal of the electronic device, the friendly metal including one or more alignment magnets of the electronic device; and
enhance flux coupling from the wireless charging winding of the wireless power transmitter into the wireless charging winding of the electronic device; and
one or more alignment magnets that align and secure the accessory with respect to the face of the wireless power transmitter.

24. The accessory of claim 23 the core is ferrite ring dimensioned to shield friendly metal and alignment magnets of the electronic device from flux induced by at least one wireless charging winding of the wireless power transmitter.

25. The accessory of claim 24 wherein the ferrite ring comprises one or more tabs sized and dimensioned to be positioned near one or more wireless charging windings of the wireless power transmitter to provide at least one of shielding or flux redirection.

26. The accessory of claim 24 wherein the core further comprises additional ferrite bars sized and dimensioned to be positioned near one or more wireless charging windings of the wireless power transmitter to provide at least one of shielding or flux redirection.

* * * * *